3,835,054
METHOD FOR PREPARATION OF THERMAL INSULATION BOARD

Edward W. Olewinski, Stickney, and Linda J. Pluta, North Riverside, Ill., assignors to Nalco Chemical Company, Chicago, Ill.
No Drawing. Filed July 10, 1972, Ser. No. 270,365
Int. Cl. C04b 43/02; F16l 59/00
U.S. Cl. 252—62       3 Claims

ABSTRACT OF THE DISCLOSURE

A method or procedure for the preparation of thermal insulation board wherein a ceramic fiber such as Fiberfrax is slurried with silica sol and sequentially with a source of alumina. The solution is adjusted to a slightly acid-neutral pH of 5–7 and the slurry is flocculated with a minor amount of an anionic polymer consisting of a latex of acrylamide/acrylic acid. The flocculated mix is subsequently vacuum formed and dried under conventional procedures.

---

The present invention relates to a generalized procedure for the preparation of thermal insulation board utilizing as a coating or binder for the basic ceramic fibers both colloidal silica or silica sol and alumina derived preferentially from alum or sodium aluminate. Further, in order to flocculate or floc the system, a unique organic additive is utilized in a minor amount which consists initially of a water-in-oil emulsion which on use is inverted to a polymer-in-water emulsion or solution, or latex. An example of such an additive is set out in 3,624,019 Anderson et al. (Nalco), Table 2, Runs 3 and 8.

Prior art relative to the present invention is set out below.

2,886,466 Iler et al. (E. I. du Pont Co.) utilized silica sol in the broad range 3–150 m$\mu$ of average diameter together with a clay such as bentonite as additives to binding masses of inorganic fibers. The patentee defined inorganic fibers to include glass fibers, rock wool asbestos fibers, and aluminosilicate fibers. Patentee also may add a source of alumina to product a silica-alumina-clay binder and conventional polymers such as formaldehyde condensates may also be added.

2,731,359 Nicholson (The Carborundum Co.) describes refractory fibrous material and ceramic materials suitable for use as heat insulating bodies similar to the properties described for Fiberfrax of the same company.

3,077,413 Campbell (The Carborundum Co.) teaches the utilization of colloidal silica for forming the saturated ceramic fibers into shapes. The ceramic fibers utilized are described under the trade name Fiberfrax and colloidal silica is designated to coat the fibers and reduce slippage by the production of a new roughened surface.

3,092,247 Woodruff (Refractory Products Co.) teaches refractory products of pre-determined shape and a mat with suitable moldable hardenable binder. Colloidal silica is disclosed as well as the utilization of thermosetting polymers such as urea-formaldehyde, melamine and phenol-formaldehyde resins.

3,353,975 Shannon et al. (Owens Corning) describes a lightweight, inorganic aggregate such as perlite coated with a silane and bonded with silica sol, alumina sols, etc.

3,551,266 Webb (NASA) teaches an unfired ceramic insulation containing finely divided refractory fibers utilizing a gelled silica sol binder.

As above noted, workers in the art have attempted to find an answer in coating the basic mineral fibers, but the problem of properly flocculating the silica and alumina additives has been a serious one in that without an organic flocculating agent, a proper coating or binder is not achieved for the fibers but utilization of an appreciable amount of an organic agent makes the board product subject to heat degradation where heat resistance is the property desired. Thus, in the present invention, a minor quantity of an effective flocculant has been found to give increased strength to the board, coupled with a lack of any substantial heat degradation in the product.

COMPONENTS OF THE COMPOSITION

The Ceramic Fiber

A highly preferred ceramic fiber material usually of equal parts of alumina and silica is available under the trade name Fiberfrax from The Carborundum Company. Fiberfrax is further defined in the Condensed Chemical Dictionary, 8th Edition, Van Nostrand-Reinhold, 1971, page 388. As preferably utilized in the bulk fiber form, it may be described as a ceramic fiber basically composed of 51.3% of $Al_2O_3$ and 47.2% $SiO_2$ where the fibers range in length up to 1½ inches and have a mean diameter of 2 microns. Such fibers are capable of withstanding continuous use temperatures up to 2300° F. and short-term exposures to higher temperatures. As utilized in the present invention a 0.5–5% slurry in water is prepared and used.

Colloidal Silica Sol

Colloidal silica sol may be prepared and utilized under a preparation using an input of sodium silicate through a bed of cation-exchange resin in the hydrogen form as noted in Ralph K. Iler, The Colloid Chemistry of Silica and Silicates, 1955, page 93, and U.S. 2,242,325 Bird (Nalco Chemical Co.). Commercially, silica sols are available from the Nalco Chemical Company, Chicago, Illinois, under trade designation Nalcoag as, e.g., Nalcoag 1115, and from the E. I. du Pont Company under the trade designation Ludox. Preferred silica sols contain particles of average diameter of 3–150 m$\mu$. As utilized in the present invention, a 1–15% $SiO_2$ as silica sol is utilized based on the fiber content.

Alumina

As utilized in the present invention, the alumina is preferably obtained from a source consisting of alum (aluminum sulfate) or sodium aluminate, and after the addition of the alumina, the pH of the solution is then adjusted to weakly acid or neutral in the range of about 5–7 by adding acid or base depending on the alumina source. The amount of alumina utilized is from 0.1–10% based on the fiber.

The Anionic Polymer

As a flocculating agent a minor amount of an anionic polymer is utilized, which is a latex copolymer of acrylamide and acrylic acid prepared according to the teachings in 3,624,019 Anderson et al (Nalco), supra. The acrylamide/acrylic acid percentage in the polymer may vary from about 90/10 to 10/90 with the preferred about 70/30. The utilization of this polymer has been found to increase effective strength of the product but not to increase the heat degradation. It should be noted that the polymer used in this invention need not be in the emulsion formed as described in U.S. 3,624,019. This invention may be practiced using an aqueous solution of the dry polymer.

The board formed from the slurry mix by vacuum forming and drying has been found to have densities ranging from 8–24 lbs./ft.³ with strengths of 10–150 p.s.i. Within the limits of polymer addition, an increase in polymer with constant alumina and silica gives decreased density, strength, and forming time.

EXAMPLE 1

140 g. of Fiberfrax were slurried in 5600 ml. tap water. 51.3 g. silica sol (Nalcoag 1115) and 40 g. #5 sodium aluminate were added and the slurry was mixed for 15 minutes. The pH was adjusted to 5.5 with $H_2SO_4$ and 350 ml. of 0.1% solution of acrylamide/acrylic acid copolymer were added. Mixing was continued slowly until the system was flocculated. The slurry was then poured into a 10½" x 10½" box with a screen on the bottom and vacuum applied to draw off the water. The pad was then dried overnight at 110° C.

The dried pad had a strength of 90 p.s.i. and a density of 18.5 lbs./ft.$^3$. After firing at 1300° F. for one hour, the strength was 100 p.s.i.

EXAMPLE 2

140 g. of Fiberfrax were slurried in 5600 ml. tap water. 57.9 g. silica sol (Nalcoag 1115) and 54.9 g. alum were added and the slurry was mixed for 15 minutes. The pH was adjusted to 6.5 with NaOH and 130 ml. of 0.1% acrylamide/acrylic acid copolymer were added. Mixing was continued slowly until the system was flocculated. The slurry was then poured into a 10½" x 10½" box with a screen on the bottom and vacuum applied to draw off the water. The pad was dried overnight at 110° C.

The dried pad had a density of 17.7 lbs./ft.$^3$ and a strength of 102 p.s.i. After firing at 1300° F. for one hour, the strength was 107 p.s.i.

EXAMPLE 3

Following the procedure of Example 1, a 5% mineral fiber was slurried in water and the same percentage of colloidal silica and sodium aluminate were utilized. The slurry was mixed 15 minutes and the pH adjusted to 6 with sulfuric acid. Then 0.25% of an anionic copolymer identified as an acrylamide/acrylic acid was added where the weight was based on the mineral fiber and the polymer was added as a 0.1% product solution. The mixture was slowly agitated until flocculation occurred whereupon it was vacuum formed into a fiber mat and dried for use as thermal insulation.

The embodiments of this invention in which an exclusive property or privilege is claimed are defined as follows:

1. A method of making thermal insulation board which comprises mixing about 2–5% of an aqueous slurry of mineral fibers with 1–15% of silica sol based on the weight of the fibers and having a particle diameter of about 4–100 m$\mu$ and adding 0.1–10% of a source of alumina selected from the group consisting of alum and sodium aluminate and adjusting the solution pH to about 5–7 and adding 0.01–2% based on fiber of an anionic polymer flocculating agent consisting of an acrylamide/acrylic acid latex and drying and forming said board.

2. The method of Claim 1 wherein the source of alumina is alum.

3. The method of Claim 1 wherein the source of alumina is sodium aluminate.

References Cited

UNITED STATES PATENTS

| | | | |
|---|---|---|---|
| 3,629,116 | 12/1971 | Gartner et al. | 252—62 |
| 3,311,585 | 3/1967 | Edlin | 117—137 |
| 3,634,250 | 1/1972 | Commons | 252—62 |
| 3,624,019 | 11/1971 | Anderson et al. | 260—29.6 H |
| 3,396,112 | 8/1968 | Burrows | 252—62 |

BENJAMIN R. PADGETT, Primary Examiner

I. GLUCK, Assistant Examiner

U.S. Cl. X.R.

106—65, 69; 117—137, 140 R; 252—313 S, 260—29.6 H